tent Office 2,719,137
Patented Sept. 27, 1955

2,719,137

TOUGH, RIGID COMPOSITION OF VINYL CHLORIDE POLYMER AND RUBBERY DIOLEFIN-ACRYLIC ESTER COPOLYMER

Pliny O. Tawney, Passaic, Robert H. Snyder, Newark, and Roger W. Amidon, Oakland, N. J., assignors to United States Rubber Company, New York, N. Y., a corporation of New Jersey No Drawing. Application December 6, 1951, Serial No. 260,334

15 Claims. (Cl. 260—45.5)

This invention relates to improved thermoplastic compositions which are rigid and yet have a high impact strength, and more particularly it relates to thermoplastic compositions comprising blends of vinyl chloride polymers with relatively small amounts of a rubbery copolymer of a conjugated diolefin with an acrylic-type ester.

The ordinary polyvinyl chloride of commerce is a hard, rigid, chemically resistant thermoplastic polymer, and it has come into widespread use in a large variety of applications because of its desirable combination of physical properties. However, the material has one major disadvantage, namely, relatively poor impact resistance, which precludes its successful use in fabricating rigid articles that must withstand blows in normal usage. When polyvinyl chloride is compounded with relatively large amounts of soluble plasticizers (e. g., 50–100 parts of plasticizer per 100 parts of polyvinyl chloride) the resulting products are flexible, soft materials suitable for forming films and the like, but the making of hard, rigid articles is thereby entirely precluded.

One object of the present invention is to compound polyvinyl chloride in such a way as to retain its rigidity, hardness and flexural strength while raising its impact strength significantly.

Another object of the invention is to produce improved polyvinyl chloride compositions capable of being fabricated into non-brittle, tough, rigid articles, which substantially retain the excellent chemical resistance and resistance to heat distortion which are characteristic of the polyvinyl chloride itself.

According to the invention, a major amount of vinyl chloride polymer is compounded with a minor amount of a copolymer of a conjugated diolefin with an acrylic-type ester. This combination of materials has most unexpectedly been found to result in a spectacular improvement in the impact strength. Furthermore, in these mixtures the unexpected improvement in impact strength is obtainable without reducing the rigidity significantly. The invention therefore provides improved vinyl chloride polymer compositions which are rigid but non-brittle, and are therefore adapted to formation of rigid sheets or films, or other articles capable of rendering excellent service, even in applications where polyvinyl chloride has heretofore been considered totally unsuited.

The vinyl chloride polymer used in the invention may be either polyvinyl chloride itself, or a copolymer of vinyl chloride with another monomer such as vinyl acetate or vinylidene chloride. These polymeric materials will be designated generally as vinyl chloride polymers.

The rubbery copolymer component of the mixtures of this invention is defined as a copolymer of a conjugated diolefin with an acrylic-type ester having the structure $CH_2=CX \cdot COOR$, where R is a radical such as alkyl, alkoxyalkyl and chloroalkyl, and X represents a radical such as hydrogen, methyl or chlorine. These materials will be referred to generally as acrylate rubbers or elastomers.

The compositions of the invention contain, in 100 parts thereof, from about 3 parts to about 35 parts by weight of the acrylate copolymer, and correspondingly from about 97 parts to about 65 parts of the vinyl chloride polymer. Compositions containing less than 3 parts of the acrylate rubber do not show a satisfactory improvement in impact strength. On the other hand, it is found that compositions containing more than about 35 parts of the acrylate rubber have very low tensile strength, low rigidity, and low tear resistance, as well as a very poor physical appearance characterized by excessive lumpiness. They are of no value in making rigid articles of high impact strength. The preferred compositions contain from about 5 parts to about 20 parts of the acrylate rubber in 100 parts of the mixture of acrylate rubber and vinyl chloride polymer.

The mixtures can be molded, calendered, extruded, or otherwise fabricated into articles of the desired shape, by the machinery and methods conventionally used in making plastic articles. The mixtures are most useful in fabricating articles which need high impact strength in combination with rigidity, e. g., rigid sheets, rods, and many other molded, extruded or expanded articles. The new compositions are especially useful in making rigid pipe which is much lighter in weight than metal pipe.

The compositions of the invention are prepared by intimately mixing the vinyl chloride polymer and the acrylate rubber together. Usually, the two materials are mixed together in the solid form by means of a mixing machine of the type usually used for mixing rubber or plastics, e. g., a roll mill or a Banbury mixer. It is also possible to mix the two ingredients in dispersed form, that is, the latices of the vinyl chloride polymer and the acrylate rubber may be mixed together and then coagulated to yield the desired blend. If desired, one of the materials in solid form, e. g., polyvinyl chloride powder, may be dispersed in a latex of the other material, the mixture thereafter being dried. The materials may also be dissolved separately in a suitable organic solvent, the solutions mixed, and the solvent removed by evaporation or other means. The compositions may be modified by the addition of optional ingredients, such as fillers, dyes, pigments, stabilizers, etc. However, regardless of the method of mixing the two materials, it is necessary to heat the mixture at some stage to a temperature above that at which the vinyl chloride polymer fuses, in order to obtain an adequately intimate combination of the materials. Temperatures within the range of about 250°–300° F. are generally adequate for this purpose. Without such heating the vinyl chloride polymer will exist as discrete particles in the mixture, and the desired physical properties will not be obtained. This heating is most conveniently done during mixing on the mill or in the Banbury, or during the final molding. A stabilizer is preferably added to the mixture before heating in order to minimize the splitting off of hydrogen chloride, and to neutralize any hydrogen chloride which does evolve. Hydrous tribasic lead sulfate, a typical stabilizer for polyvinyl chloride, is an example of a suitable stabilizer.

The toughening effect of the acrylic rubber in our vinyl chloride polymer composition differs radically from the softening or plasticizing effect of conventional "plasticizers" in that adequate rigidity of the composition is retained and the impact strength is greatly increased, whereas plasticizers greatly reduce the rigidity and do not impart high impact strength. Thus, in a typical embodiment of the invention the impact strength can be raised from a value for the vinyl chloride polymer itself of about 0.8 foot-pound per inch of notch (Izod) to a value for the blend of up to 27 foot pounds without reducing the rigidity below practical limits.

It is interesting to note that neither butadiene homopolymer, nor an acrylic ester homopolymer, e. g., polymerized ethyl acrylate, raises the impact strength of vinyl chloride polymers significantly. Consequently, it is most surprising to find that the diolefin-acrylate copolymers improve the impact strength to such an extraordinary extent. The acrylate copolymer improves the impact strength of polyvinyl chloride even though it is present in such a small amount as not to decrease the rigidity of the composition markedly. The rigidity or flexibility of the materials is generally expressed in terms of the flexural modulus. Polyvinyl chloride itself has a flexural modulus at 25° C. of about 400,000 pounds per square inch. In general, it may be stated that materials having a flexural modulus above 100,000 p. s. i. are sufficiently stiff to be employed in the usual applications requiring a rigid material. However, it is preferred to use materials having a flexural modulus of at least 150,000 p. s. i. in fabricating rigid articles. The preferred compositions of the invention are therefore those having a flexural modulus of at least 150,000 p. s. i. The values recorded in the examples herein are the actual measured values times $10^{-3}$. These compositions also have an impact strength of at least twice that of the vinyl chloride polymer itself, and usually very much higher. The compositions having these physical properties are those containing about 3 to 35 parts of the acrylate rubber in 100 parts of combined vinyl chloride polymer and rubber.

The polyvinyl chloride used in the invention is typified by the commercially available resins known as the Marvinols, e. g., Marvinol VR-10 and Marvinol VR-20. Marvinol VR-10 is used where high heat stability is desired during processing, as in slush molding or extruding pipe. The specific viscosity of 0.4 g. of the Marvinol in 100 cc. of nitrobenzene, at 30° C., is 0.55. Marvinol VR-20 is a general purpose resin used in coated fabrics, unsupported film, electrical insulation, etc. Its specific viscosity, measured in the same way is 0.38. Other polyvinyl chloride resins which are operable in our invention are Geon 121, Geon 101, Geon 101-EP and Vinylite QYNA. The vinyl chloride: vinyl ester copolymers used are exemplified by the commercially available resins known as the Vinylites, especially those which are copolymers of vinyl chloride and vinyl acetate ranging in composition from about 85% to 96% of vinyl chloride and correspondingly from about 15% to 4% of vinyl acetate. The vinyl chloride: vinylidene chloride copolymers used contain up to 99% of vinyl chloride. They are typified by the Sarans.

The acrylate rubbers used in the invention are typically copolymers of an acrylate, chloracrylate, or methacrylate ester and a conjugated diolefin. The esters are those derived from the aliphatic alcohols, the ether alcohols and the chlorinated alcohols, and particularly those from the lower alcohols such as methanol, ethanol, propanol, isopropanol, the butanols, etc., and from the corresponding ether alcohols such as 3-ethoxypropanol, and from the corresponding chlorinated alcohols such as 2-chloroethanol.

The diolefins used in preparing the acrylate elastomer are any conjugated diolefins copolymerizable with the acrylate esters, and particularly butadiene and isoprene. The proportions as expressed by the feed ratios of acrylate ester to diolefin ordinarily range in weight from about 30:70 to about 85:15.

The acrylate or methacrylate ester used in making the acrylate rubber can be varied widely, as stated. For example, the elastomers can be made from a diolefin and an alkyl acrylate or methacrylate such as the methyl, ethyl, propyl, isopropyl, butyl, amyl, hexyl, or octyl, etc., ester. However, as the carbon content of the alcohol portion of the esters is increased, the range of ester-to-diolefin feed ratios within which the elastomer significantly improves the impact strength of the new compositions becomes narrower and is shifted toward higher ratios of ester. Methyl acrylate, for example, can be copolymerized with butadiene in feed ratios varying between about 30:70 and 75:25. However, 2-ethylhexyl acrylate forms rubbery copolymers which are useful for the present purpose only when the feed ratio of ester and butadiene is between about 70:30 and 85:15.

The following examples illustrate the invention in more detail. All compositions are given in parts by weight. All of the acrylate copolymers used in the examples were made by emulsion copolymerization.

*Example 1*

| Compositions | A | B | C | D | E |
|---|---|---|---|---|---|
| Polyvinyl chloride powder[a] | 100 | 95 | 90 | 85 | 70 |
| Methyl acrylate: butadiene copolymer latex[b] | | [c] 5 | [c] 10 | [c] 15 | [c] 30 |
| Properties: | | | | | |
| Izod impact strength (ft. lbs./in. of notch) | 0.8 | 2.7 | 14.5 | 15.1 | 20.4 |
| Flexural modulus at 25° C. (p. s. i.×10⁻³) | 440 | 329 | 303 | 247 | 122 |

[a] Commercial material known as Marvinol VR-10.
[b] Feed ratio of methyl acrylate:butadiene 65:35, conversion, 89%.
[c] Solids content.

The polyvinyl chloride powder was stirred with the methyl acrylate:butadiene latex, the mixture was dried in vacuo, fused on a mill for 5 minutes at 300–310° F., and molded in a flat sheet at 338° F. for 10 minutes with a pressure of 450 p. s. i. Stock A, consisting of polyvinyl chloride only, which is shown for contrast with the stocks (B—E) exemplifying the invention, was milled and molded in like manner. It is evident that the inclusion of the acrylic elastomer in the compositions effects a spectacular improvement in their impact strength over that of polyvinyl chloride, while their rigidity is still adequate.

*Example 2*

These stocks were prepared as described in Example 1.

| | Composition of Elastomer[a] | | Composition of Blend | | Properties of Blend | |
|---|---|---|---|---|---|---|
| | Methyl Acrylate | Butadiene | Elastomer | Polyvinyl Chloride | Impact Strength | Flexural Modulus |
| C | 65 | 35 | [b] 10 | 90 | 14.5 | 303 |
| F | 50 | 50 | [c] 5 | 95 | 3.3 | 367 |
| G | 50 | 50 | [c] 10 | 90 | 14.7 | 325 |
| H | 35 | 65 | [d] 5 | 95 | 2.3 | 376 |
| I | 35 | 65 | [d] 10 | 90 | 7.3 | 330 |
| J | 35 | 65 | [d] 15 | 85 | 2.3 | 264 |

[a] Feed ratio.
[b] Copolymer described in Example 1.
[c] Conversion 78.5%.
[d] Conversion 77%.

This example shows that methyl acrylate:butadiene copolymers of widely varying feed ratios, according to the invention, give compositions of improved impact strength.

*Example 3*

These stocks were prepared as described in Example 1.

| | Composition of Elastomer[a] | | Composition of Blend | | Properties of Blend | |
|---|---|---|---|---|---|---|
| | Butyl Acrylate | Butadiene | Elastomer | Polyvinyl Chloride | Impact Strength | Flexural Modulus |
| K | 82 | 18 | [b] 5 | 95 | 4.6 | 361 |
| L | 82 | 18 | [b] 10 | 90 | 16.4 | 287 |
| M | 70 | 30 | [c] 5 | 95 | 3.2 | 347 |
| N | 70 | 30 | [c] 10 | 90 | 13.8 | 276 |
| O | 50 | 50 | [d] 5 | 95 | 2.0 | 388 |
| P | 50 | 50 | [d] 10 | 90 | 2.0 | 336 |

[a] Feed ratio.
[b] Conversion 77%.
[c] Conversion 78%.
[d] Conversion 81%.

This example shows that butyl acrylate:butadiene elastomers of widely varying feed ratios are effective in improving the impact strength of polyvinyl chloride.

Example 4

These stocks were prepared as described in Example 1.

|   | Composition of Elastomer a | | Composition of Blend | | Properties of Blend | |
|---|---|---|---|---|---|---|
|   | Ester | Butadiene | Elastomer | Polyvinyl Chloride | Impact Strength | Flexural Modulus |
| Q | 75 | 25 | b 5 | 95 | 2.6 | 408 |
| R | 75 | 25 | b 10 | 90 | 3.7 | 368 |
| S | 75 | 25 | b 15 | 85 | 1.9 | 274 |
| T | 75 | 25 | c 5 | 95 | 3.3 | 391 |
| U | 75 | 25 | c 10 | 90 | 1.8 | 342 |
| V | 71 | 29 | d 10 | 90 | 19.6 | 300 | a Feed ratio.
b Copolymer of 3-ethoxypropyl acrylate and butadiene, conversion 78%.
c Copolymer of 2-ethylhexyl acrylate and butadiene, conversion 80.5%.
d Copolymer of 2-chloroethyl acrylate and butadiene, conversion 85%.

It is evident from this example that copolymers of butadiene with widely varying types of acrylate esters are valuable in improving the impact strength of polyvinyl chloride.

To summarize, Examples 2, 3 and 4 show that copolymers made from acrylates of widely varying aliphatic alcohols improve the impact strength of compositions of the invention over that of polyvinyl chloride alone. It is also evident that as the size of the alcohol radical in the acrylic ester is increased the proportion of ester in the copolymer must also be increased. For example, the impact strength of stocks Q–U of Example 4 is less than that obtained by raising the feed ratio of ester:butadiene above 75:25.

Example 5

These stocks were prepared as described in Example 1.

| Composition | W | X | Y |
|---|---|---|---|
| Polyvinyl chloride | 95 | 90 | 85 |
| Methyl methacrylate:butadiene copolymer a | b 5 | b 10 | b 15 |
| Properties: | | | |
| Impact strength | 2.8 | 24.8 | 27.0 |
| Flexural modulus | 361 | 296 | 243 | a Feed ratio of methyl methacrylate:butadiene, 65:35 by weight; conversion 73%.
b Solid content.

This example shows that methacrylic ester:butadiene copolymers effect as spectacular an increase in the impact strength of polyvinyl chloride as do acrylic ester:butadiene copolymers.

Example 6

These stocks were prepared as described in Example 1 except that the solid resin and elastomer were mixed on a mill at about 310–320° F.

| Composition | Z | AA | AB |
|---|---|---|---|
| Methyl acrylate:butadiene copolymer a | 10 | 10 | 10 |
| Vinyl chloride:vinylidene chloride copolymer b | 90 | | |
| Vinylite VYNW c | | 90 | |
| Vinylite VYHH d | | | 90 |
| Properties: | | | |
| Impact strength | 14.9 | 17.0 | 16.4 |
| Flexural modulus | 199 | 301 | 273 | a Feed ratio of methyl acrylate:butadiene 65:35 by weight, conversion 89%.
b Emulsion copolymer, feed ratio of vinyl chloride:vinylidene chloride 72:25 by weight, conversion 69%.
c Commercial vinyl chloride:vinyl acetate copolymer, weight ratio about 96:4.
d Commercial vinyl chloride:vinyl acetate copolymer, weight ratio about 85:15.

This example shows that the impact strength of typical vinyl chloride:vinylidene chloride and vinyl chloride:vinyl acetate copolymers is greatly increased by the addition of a methyl acrylate:butadiene copolymer according to the invention. The impact strength of these several vinyl chloride copolymers alone is no higher than that of polyvinyl chloride alone.

Example 7

This stock was prepared as described in Example 1.

| Composition | AB |
|---|---|
| Marvinol VR-10 | 90 |
| Methyl acrylate:isoprene copolymer a | 10 |
| Properties: | |
| Impact strength | 1.8 |
| Flexural modulus | 292 | a Feed ratio of methyl acrylate:isoprene 56:44 by weight, conversion 63%.

The above example demonstrates the effectiveness of the invention when the diolefin used in the acrylate copolymer is isoprene.

Example 8

| Composition | C | AC |
|---|---|---|
| Marvinol VR-10 | 90 | 90 |
| Methyl acrylate:butadiene copolymer a | b 10 | c 10 |
| Properties: | | |
| Impact strength | 14.5 | 16.5 |
| Flexural modulus | 303 | 300 | a Copolymer described in Example 1.
b Solid content.
c Copolymer was coagulated and dried before mixing.

Stock C was mixed, as described in Example 1, by stirring the polyvinyl chloride powder with the copolymer latex. Stock AC was prepared by mixing the two solid materials on a mill at 310° F. Both stocks were molded as described in Example 1. It is apparent that the method of mixing is not critical.

Example 9

A mixture of 90 parts of Marvinol VR–10, 10 parts of the same acrylate copolymer used in Example 1, and 5 parts of tri-basic lead sulfate (3PbO·PbSO4·H2O) was blended on the mill at 310° F. and molded as in Example 1. This stock (AD) had an impact strength of 20.9 and a flexural modulus of 300, showing that the addition of the lead compound, a typical stabilizer for polyvinyl chloride, has no injurious effect on these properties.

Example 10

The stocks were mixed on the mill, as shown for stock AC in Example 9, the time of milling at 310° F. being about 7–8 minutes.

| Composition | AC | AD | AE |
|---|---|---|---|
| Marvinol VR-10 | 90 | 90 | 85 |
| High-gel acrylate rubber a | 10 | | |
| Low-gel acrylate rubber b | | 10 | 15 |
| Properties: | | | |
| Impact strength | 16.5 | 6.0 | 10.0 |
| Flexural modulus | 303 | 327 | 371 | a A methyl acrylate:butadiene copolymer having a feed ratio of 65:35, a conversion of 89%, and a gel content of 61%.
b A methyl acrylate:butadiene copolymer having a feed ratio of 73:27, a conversion of 77%, and a gel content of 1%, Mooney 47.

It is evident that the improvement in impact strength is obtained both with acrylate rubber containing only a very small amount of gel and with acrylate rubber containing substantial amounts of gel.

As indicated previously, homopolymers of acrylate esters and of butadiene do not effect a significant improvement in the impact strength of polyvinyl chloride when substituted for the acrylate copolymer used in the invention. The following experiments illustrate this difference. In each experiment 90 parts of Marvinol VR–10 powder and 10 parts (solid content) of the designated homopolymer, as a latex, were blended, dried, fused on the mill and molded as in Example 1 (except as noted).

| Material Blended with Marvinol | Properties of Blends | |
|---|---|---|
| | Impact Strength | Flex. Modulus |
| Methyl acrylate polymer | 0.6 | 332 |
| Ethyl acrylate polymer a | 1.1 | 268 |
| n-Butyl acrylate polymer | 1.2 | 263 |
| 2-Ethylhexyl acrylate polymer | 0.8 | 285 |
| Polybutadiene | 1.4 | 316 | a Blended with the polyvinyl chloride on the mill.

The impact strength of these compositions is seen to be essentially the same as that of polyvinyl chloride itself.

The peculiar beneficial effect of the acrylate rubber in the present blend is furthermore all the more surprising in view of the fact that many other rubbery materials, including the common nitrile rubber of commerce, that is, the rubbery copolymer consisting of butadiene and acrylonitrile, do not produce a comparable effect. Thus, when ordinary commercial nitrile rubber, as typified by those materials known as Hycar-OR and Paracril, is mixed in minor proportion with polyvinyl chloride, the impact strength of the resulting blend is not significantly better than that of the polyvinyl chloride itself.

The effect of conventional plasticizers on polyvinyl chloride is shown in the following experiments. The resin and plasticizer were blended on the mill and molded as in Example 1.

COMPOSITION

| Marvinol VR-10 | 100 | 90 | 90 |
|---|---|---|---|
| Dioctyl phthalate | | 10 | |
| Tricresyl phosphate | | | 10 |

PROPERTIES

| Flexural modulus | 440 | 392 | 430 |
|---|---|---|---|
| Impact strength | 0.8 | 0.5 | 0.4 |

It is evident that the use of conventional plasticizers in an amount comparable to that used in the invention decreases the already low impact strength.

Having thus described our invention, what we claim and desire to protect by Letters Patent is:

1. A thermoplastic composition of matter comprising an intimate, fused mixture of vinyl chloride homopolymer with a binary rubbery copolymer consisting solely of an aliphatic conjugated diolefin hydrocarbon and an alkyl acrylate, the amount of said copolymer ranging from 3 to 35 percent of the combined weights of said polyvinyl chloride and copolymer, the said mixture being characterized by a flexural modulus at 25° C. of at least 100,000 pounds per square inch, and an impact strength at least two times greater than that of the said vinyl chloride polymer.

2. A thermoplastic composition of matter comprising an intimate, fused mixture of vinyl chloride homopolymer with a binary rubbery copolymer of butadiene and an alkyl acrylate, the amount of said copolymer ranging from 3 to 35 percent of the combined weights of said polyvinyl chloride and copolymer, the said mixture being characterized by a flexural modulus at 25° C. of at least 100,000 pounds per square inch, and an impact strength at least two times greater than that of the said vinyl chloride polymer.

3. A thermoplastic composition of matter comprising an intimate, fused mixture of vinyl chloride homopolymer with a binary rubbery copolymer consisting solely of butadiene and methyl acrylate, the amount of said copolymer ranging from 3 to 35 percent of the combined weights of said polyvinyl chloride and copolymer, the said mixture being characterized by a flexural modulus at 25° C. of at least 100,000 pounds per square inch, and an impact strength at least two times greater than that of the said vinyl chloride polymer.

4. A thermoplastic composition of matter comprising an intimate, fused mixture of vinyl chloride homopolymer with a binary rubbery copolymer consisting solely of butadiene and methyl acrylate, the amount of said copolymer ranging from 5 to 20 percent of the combined weights of said polyvinyl chloride and copolymer, the said mixture being characterized by a flexural modulus at 25° C. of at least 100,000 pounds per square inch, and an impact strength at least two times greater than that of the said vinyl chloride polymer.

5. A thermoplastic composition of matter comprising an intimate, fused mixture of vinyl chloride : vinylidene chloride binary copolymer with a binary rubbery copolymer consisting solely of an aliphatic conjugated diolefin hydrocarbon and an alkyl acrylate, the amount of said rubbery copolymer ranging from 3 to 35 percent of the combined weights of the two said copolymers, the said mixture being characterized by a flexural modulus at 25° C. of at least 100,000 pounds per square inch, and an impact strength at least two times greater than that of the said vinyl chloride polymer.

6. A thermoplastic composition of matter comprising an intimate, fused mixture of vinyl chloride : vinylidene chloride binary copolymer with a binary rubbery copolymer consisting solely of an aliphatic conjugated diolefin hydrocarbon and an alkyl acrylate, the amount of said rubbery copolymer ranging from 5 to 20 percent of the combined weights of the two said copolymers, the said mixture being characterized by a flexural modulus at 25° C. of at least 100,000 pounds per square inch, and an impact strength at least two times greater than that of he said vinyl chloride polymer.

7. A thermoplastic composition of matter comprising an intimate, fused mixture of vinyl chloride : vinyl acetate binary copolymer with a binary rubbery copolymer consisting solely of an aliphatic conjugated diolefin hydrocarbon and an alkyl acrylate, the amount of said rubbery copolymer ranging from 3 to 35 percent of the combined weights of the two said copolymers, the said mixture being characterized by a flexural modulus at 25° C. of at least 100,000 pounds per square inch, and an impact strength at least two times greater than that of the said vinyl chloride polymer.

8. A thermoplastic composition of matter comprising an intimate, thermoplastic, fused mixture of vinyl chloride : vinyl aceate binary copolymer with a binary rubbery copolymer consisting solely of an aliphatic conjugated diolefin hydrocarbon and an alkyl acrylate, the amount of said rubbery copolymer ranging from 5 to 20 percent of the combined weights of the two said copolymers, the said mixture being characterized by a flexural modulus at 25° C. of at least 100,000 pounds per square inch, and an impact strength at least two times greater than that of the said vinyl chloride polymer.

9. A rigid, tough, fused, intimate, thermoplastic mixture of (A) from about 97 to 65 parts of a vinyl chloride polymer selected from the group consisting of vinyl chloride homopolymer and binary copolymers of vinyl chloride with from about 1% to 15% of an additional monoethylenically unsaturable copolymerizable monomer, and (B) from about 3 to 35 parts of a rubbery binary copolymer consisting solely of a conjugated diolefin with an acrylic ester having the structure $CH_2=CXCOOR$, where X is selected from the group consisting of hydrogen, methyl and chlorine radicals, and R is selected from the group consisting of alkyl, alkoxyalkyl and chloroalkyl radicals, the said mixture being characterized by a flexural modulus at 25° C. of at least 100,000 pounds per square inch, and an impact strength at least two times greater than that of the said vinyl chloride polymer itself.

10. A rigid, tough, fused, intimate mixture of (A) from about 95 to 80 parts of a vinyl chloride polymer selected from the group consisting of vinyl chloride homopolymer and binary copolymers of vinyl chloride with from about 1% to 15% of an additional monoethylenically unsaturated copolymerizable monomer, and (B) from about 5 to 20 parts of a rubbery copolymer consisting solely of a conjugated diolefin with an acrylic ester having the structure $CH_2=CXCOOR$, where X is selected from the group consisting of hydrogen, methyl and chlorine radicals, and R is selected from the group consisting of alkyl, alkoxyalkyl and chloroalkyl radicals, said mixture being characterized by a flexural modulus at 25° C. of at least 150,000 pounds per square inch, and an impact strength at least two times greater than that of the said vinyl chloride polymer itself.

11. A mixture as in claim 9 in which the said rubbery copolymer is a methyl acrylate : butadiene copolymer.

12. A mixture as in claim 9 in which the said rubbery copolymer is an n-butyl acrylate : butadiene copolymer.

13. A mixture as in claim 9 in which the said rubbery copolymer is a 3-ethyoxypropyl acrylate : butadiene copolymer.

14. A mixture as in claim 9 in which the said rubbery copolymer is a 2-ethylhexyl acrylate : butadiene copolymer.

15. A mixture as in claim 9 in which the said rubbery copolymer is a 2-chloroethyl acrylate : butadiene copolymer.

References Cited in the file of this patent

UNITED STATES PATENTS

| | | |
|---|---|---|
| 2,419,202 | D'Alelio | Apr. 22, 1947 |
| 2,512,697 | Grotenhuis | June 27, 1950 |
| 2,538,779 | Harrison et al. | Jan. 23, 1951 |
| 2,576,148 | Schechtman | Nov. 27, 1951 |

FOREIGN PATENTS

| | | |
|---|---|---|
| 644,022 | Great Britain | Oct. 4, 1950 |
| 947,162 | France | Jan. 3, 1949 |
| 950,206 | France | Mar. 14, 1949 |